Figure 1:
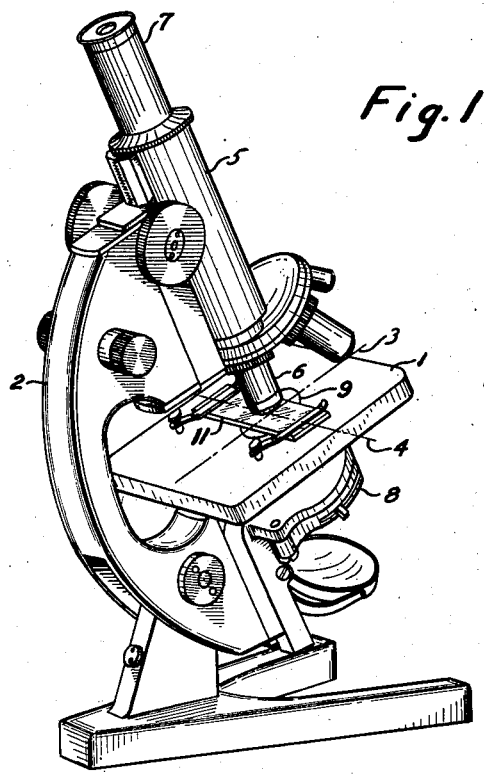

April 2, 1935.  J. BROADHURST ET AL  1,996,141
MICROSCOPE AND MICROSCOPE SLIDE
Filed Dec. 5, 1932

INVENTORS
Jean Broadhurst
Charles F. Sulzner
BY
Harris D. Hineline,
ATTORNEY

Patented Apr. 2, 1935

1,996,141

UNITED STATES PATENT OFFICE 1,996,141

MICROSCOPE AND MICROSCOPE SLIDE

Jean Broadhurst, New York, N. Y., and Charles F. Sulzner, Miami, Fla.

Application December 5, 1932, Serial No. 645,646

5 Claims. (Cl. 88—39)

This invention relates to microscopes and the various members thereof, and to the processes of microscopy, and particularly to means and methods for applying indexing marks to a microscope slide, and reference lines to a microscope stage to enable an observer to relocate with ease a previously studied portion of the subject matter on a microscope slide.

In the use of the microscope, and particularly in the use at high powers of magnification, the area of the field of view covers only a very small portion of the area of the slide, and of the subject matter thereon. The diameter of an ordinary mount may be 10 to 15 mm. whereas the diameter of the field of view of a 16 mm. focus objective is about 2.1 mm., of a 4 mm. focus objective about 0.4 mm., and of a 1.8 mm. objective about 0.2 mm. In consequence, it may be very difficult to relocate a point of interest on the slide, in the absence of land marks or guides of some kind, after the slide has been moved about, or removed from the microscope stage. Thus, while a given slide may be known to exhibit a certain subject matter, the exact point on the slide at which the matter occurs may be not only extremely difficult to find, but may require about as much searching as was needed to find it originally.

Thus, a section of tissue, stained and mounted in the usual way on a slide may show a single cell having features of interest when examined under high power. Such a cell, or other item, is usually found in the first place by a systematic search of the slide, but when the slide is once removed from under the objective lens of the microscope, the cell or other item can only be found again by a similar search. This is of course very undesirable because of the waste of time involved, and the tediousness of the search.

The various previously suggested relocating means, such as ink circles around the desired area are unsatisfactory, since they merely reduce the area to be searched, and the presence of them may obscure other subject matter of importance. Also they tend to be impermanent, since they rub off easily. Various forms of mechanical microscope stages have been proposed, and various systems of graduations or calibrations have been offered, some of which will relocate a point on a slide, to show the desired spot, when the slide is replaced on the stage on which it was originally charted, but the charting of a slide on one stage is usually worthless on another stage, or with another type of device, since there is no uniformity of system, and no agreement of graduations, as well as no establishment of base lines, or reference lines. Likewise the various devices are not interchangeable, and all are expensive.

The device of the present invention provides a simple, effective, inexpensive, interchangeable means for relocating a desired point when once found on a slide, under any microscope, by means of cooperating marks on the slide and reference lines on the microscope stage.

The objects of this invention are thus to relocate a point on a microscope slide after it has once been found and charted, and the slide moved; to relocate such a point with a high degree of accuracy; to relocate it with similar accuracy on any suitable microscope stage; and to use in such relocating only simple and inexpensive means. Still another object is to apply to a slide identifying marks such that a desired point on that slide can be brought immediately within the field of view of any microscope by means merely of reference marks on the slide and stage. A further object is to replace a microscope slide in substantially the same position with respect to the optical axis of the microscope as at a previous time or on another microscope. A still further object of the invention is to adapt any microscope to use with charted slides, with only minor mechanical changes therein. Another object is to modify a microscope for the application thereto of index marks according to the position of the center of interest in the slide.

The above objects, and others not mentioned, are attained by the use, according to this invention, of a slide having markable or graduated edges, adapted to cooperate with reference lines upon the microscope stage, the reference lines preferably intersecting at substantially the optical axis of the microscope lens system.

This invention is an improvement over the device shown in Patent #1,876,176, issued September 6th, 1932, to Charles F. Sulzner, one of the joint inventors of the invention disclosed and claimed in this application.

Figure 2:
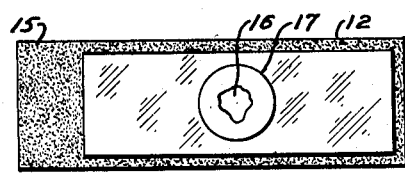
Figure 3:
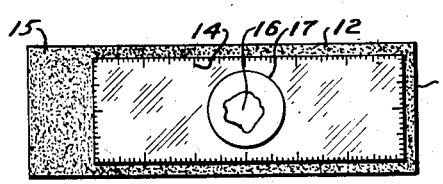

Still other objects, and structural details of the invention will be apparent from the following description when read in connection with the accompanying drawing, wherein, Figure 1 is a perspective view of a microscope and slide with index and reference marks according to this invention, Figure 2 is a top view of a microscope slide prepared according to this invention, and Figure 3 is a top view of a microscope slide prepared according to an alternative embodiment of the invention.

Referring to the figures, the stage 1 of the microscope 2 is marked with reference lines 3 and 4, which intersect, preferably, at the optical axis of the lens system 5, made up of the objective lens 6, occular 7, and condenser 8. These lines are preferably engraved upon the upper surface of the stage 1, at right angles to each other, the imaginary extensions across the opening 9 in the center of the stage being the intersecting portions. These reference lines are preferably applied to the microscope stage during the manufacture thereof, but they may also be applied to the microscopes already in use by the methods described in the previously mentioned Patent #1,876,176.

It is of course unnecessary to have actual discrete members such as cross hairs in the opening 9, although such cross hairs are not excluded from the scope of the invention.

In the form of the invention shown, the reference lines 3 and 4 are indicated as applied to a simple, square, microscope stage. Such reference lines can of course be equally well applied to a circular stage, and to the so called mechanical stage. In the later case, the reference lines should be applied to a portion of the stage, such as the stage base which is fixed in position with respect to the optical axis of the microscope lens system.

The intersection of the reference lines 3 and 4 should coincide with the optical axis of the microscope lens system with a good degree of accuracy, the permissible departure from exact coincidence being about equal to half of the diameter of the field of view of the highest power objective to be used on that microscope, for most satisfactory service, although a lower degree of accuracy will greatly simplify and shorten the search for a previously charted point on the slide.

The slide of Figure 1 is prepared, as shown in further detail in Figures 2 and 3, with an indexing edge. In the embodiment of Figure 2, this is simply a roughened or markable margin 12 on the glass of the slide, which may be produced by etching, sand blasting, a suitable adherent coating, or other convenient means. In the embodiment of Figure 3, the roughened margin is supplemented, or may be replaced by, a series of graduations 14 along each edge. The roughened or markable margin, in either example, is of a type adapted to receive and hold appropriate marks, such as lines of India ink, lead pencil, or other marking means. The slide may also, if desired, have a larger roughened or markable portion 15, adapted to the application of descriptive notes, charting records, etc., at one or both ends.

The roughened margin 12 on the slide is preferably prepared during the manufacture of the glass slip for the slide, since it is most easily applied at that time. A sand blast is a convenient means for producing the roughening, and if it is applied to the glass slip in the course of the original preparation, the occasional breakage of an unfinished slip is immaterial. The roughened margin may also be applied to finished slides, carrying preparations for microscopic examination. In this instance however, more careful handling of the slide is desirable, to avoid risk of breakage, and loss of the preparation. Accordingly the roughening may be produced by etching with a preparation such as hydrofluoric acid or other suitable etching compound, applicable to glass. The edge of the slide may be coated with the etching preparation, or it may be dipped into an etching solution. Alternatively, a markable coating may be used such as gelatine, egg white, thin shellac, gum damar, or other appropriate substance, applied in a margin line around the slide, the index marks being applied with an appropriate marking substance.

The graduations 14 of the embodiment of Figure 3 may likewise be produced by such means as sand blasting, etching etc., through a mask, or may be applied by a printing or similar process, using an etching paste, or a coating as previously described, to secure the desired marks.

In the operation of this invention the customary methods of preparation of the material for the subject matter on the slide are used, to give the desired character to the specimen 16, shown in Figures 2 and 3 under the cover glass slip 17. The usual examination of the slide is then made under the microscope, and any features of interest located. This of course, brings such features into close approximation to the optical axis of the microscope lens system, and to the intersection of the lines 3 and 4. Without moving the slide on the stage, marks are then made on the margins of the slide, immediately over the stage cross lines 3 and 4. These are the indexing marks, and are obviously in a fixed relationship to the reference cross lines 3 and 4, the intersection of the lines, and the optical axis of the microscope lens system, and are adapted to the ready reconstruction of that relationship. It is usually preferable to mark all four margin sides, although, if means, such as a mechanical stage, is provided for maintaining the position of the slide strictly parallel with the reference lines, marks on two may be sufficient. The marks may of course be made with any suitable and convenient marking means, although India ink may be preferred as most permanent, and lead pencil as most convenient and simple.

The marks thus made are adapted to cooperate with the reference lines on the stage of the same or any other reference lined microscope stage. They chart the slide, and make is readily possible to find at any other time and place the point on the slide charted by them, and to bring into the field of view of any microscope the features of interest as seen in the field of the microscope on which the marks were made.

This is accomplished, at the other times and places by simply positioning the slide upon the stage of the desired microscope, with the index lines of the slide directly over the reference lines of the stage, thus automatically bringing the charted point on the slide to the point of intersection of the reference lines, and into the field of view of the microscope, without the searching which is otherwise necessary. This is of course readily possible with any microscope having a stage equipped with the reference lines, and no variation in accuracy of relocating, or ease of operation, is found from instrument to instrument. The slide may be examined under any microscope, so equipped, and the point of interest found without delay or searching, provided only that the reference lines are present on the stage. And this is readily possible without the further calibration or adjustment otherwise necessary with the usual type of mechanical stage.

In the original charting of the slide when it is first examined, it is not necessary, for the convenient application of the index marks, that the slide be held in any special position on the stage, as parallel with an edge. Instead, the slide may be shifted about to bring the subject matter into the most convenient position for examination, regardless of the angular position with respect to the reference lines. The index marks are then made on the margins of the slide as described, and then serve, not only to relocate the point of interest, but also to bring the slide to the most convenient position for examination, as previously determined.

A given point of interest in the subject matter on the slide is thus located by four margin marks, in pairs. If there is more than one point of interest in the subject matter, all such points may be charted for relocation by marks on the slide margins. Two points may be located by two sets of index marks, in pairs as before. However, if the same type of marking medium is used for both sets, there is a possibility of some confusion, since a pair of index marks of one point may be combined with the supplemental pair from the other, giving a false location. This makes possible four point locations, two of which are correct, and two of which are false. This confusion is easily avoided by the use of different marking means for each point, as differently colored inks or pencils, or by the use of distinguishing numbers or letters associated with the respective marks. By this means all question of false location is avoided.

As shown in Figure 3, the slide may also be provided with marginal graduations in centimeters and milimeters, or inches and fractions, as desired, either with or without the markable margin. The graduations may be in the form of lines of varying length as shown, or may be in the form of lines and dots, and may be placed either adjacent the edge, with or without a markable margin nearer the center, or may have the markable margin interposed between the edge and the graduations. If the markable margin is provided, it may be used as before described, without regard to the graduations.

However, the graduations may be used in an alternative way, which is under some circumstances convenient. In this alternative, the subject matter of interest is found by the usual first search, and the position of the graduations with respect to the reference lines is noted when the matter of interest is in the field of view. This may be recorded in any convenient way, as by ink or pencil upon a record sheet, or on a label stuck onto the slide, or on the roughened or markable area at one end of the slide as shown in the drawing. The record may be in the form of a reading in millimeters of the distance from the left end of the graduations to the point on the scale under which the vertical reference line appears, and a reading down from the top of the graduations to the point on the vertical scale under which the horizontal reference line appears. Readings may be made and recorded for all four edges, but if the center line of the slide is kept parallel with one of the reference lines, this is not necessary, one horizontal reading and one vertical reading being sufficient. To relocate the point, it is then merely necessary to move the slide on the stage to bring the recorded divisions over the reference lines, whereupon the indexed point will be found in the field of view of the microscope.

Still another alternative embodiment is found in the use of a coated margin as above described, which is marked by means of a needle point or other scriber over the reference lines, in an analogous manner.

The system of this invention thus provides a new, useful, simple and convenient means for indexing a microscope slide, by which means points of interest in the subject matter on the slide may, after having once been found, be indexed so as to be readily relocated at any time with little or no search, on any microscope equipped with the simple reference lines.

While there are above disclosed but a limited number of embodiments of this invention, it is possible to produce still other embodiments without departing from the inventive concept herein disclosed, and it is therefore desired that only such limitations shall be imposed on the appended claims as are indicated therein, or required by the prior art.

The invention claimed is,

1. In combination, a microscope slide having subject matter thereon occupying a substantial portion thereof, roughened margins on said slides adapted to receive marks which become integral portions of said slide, and a plurality of microscope stages having cross lines intersecting at the optical axis of the microscope adapted to cooperate with marks upon said roughened margins.

2. A microscope slide having roughened borders adapted to receive permanent register marks for locating a portion of a specimen thereon in the optical field of a microscope by cooperation with cross lines on a microscope stage, said borders extending along at least three edges of the slide.

3. A microscope slide having specimen material occupying a substantial portion thereof, and roughened borders adapted to receive permanent register marks for locating a portion of said specimen in the optical field of a microscope by cooperation with cross lines on a microscope stage, said borders extending along at least three edges of the slide.

4. A microscope slide having specimen material occupying a substantial portion thereof, roughened borders along all four edges thereof, and permanent register marks upon said roughened borders whereby said slide may be placed upon a microscope stage in a predetermined position.

5. In combination, a plurality of microscope slides each having subject matter thereon and roughened margins therearound, and a plurality of microscopes each having a stage with reference lines thereon intersecting at the optical axis of the microscope, said slide margins having permanent register marks thereon positioned according to the location of desired portions of the subject matter and adapted to cooperate with said lines on any of the microscope stages to position the desired portion of the subject matter within the field of view of the microscopes.

CHARLES F. SULZNER.
JEAN BROADHURST.